United States Patent [19]
Gutnajer

[11] 3,723,695
[45] Mar. 27, 1973

[54] EDM ELECTRODE
[75] Inventor: Ludwik Gutnajer, Carversville, Pa.
[73] Assignee: The Budd Company, Philadelphia, Pa.
[22] Filed: Dec. 17, 1971
[21] Appl. No.: 209,059

[52] U.S. Cl............................219/69 E, 204/143 M
[51] Int. Cl............................B23p 1/04, B23p 1/08
[58] Field of Search........219/69 E, 69 R; 204/143 M

[56] References Cited
UNITED STATES PATENTS 3,244,852 4/1966 Herterick et al....................219/69 E
3,035,151 5/1962 Weglarz.............................219/69 E
2,861,164 11/1958 Stegler..............................219/69 E

*Primary Examiner*—R. F. Staubly
*Attorney*—Thomas I. Davenport et al.

[57] ABSTRACT

An all metal EDM electrode comprises a hollow shell with attachment means. The electrode is formed by depositing a layer of metal on a mandrel having a surface contoured to a desired configuration. A plurality of metal inserts are attached to the layer of metal. A second layer of metal is then deposited over the first coating and the metal inserts. The metal inserts serve as elements to permit the electrode to be mounted to a movable ram in an electric discharge machining unit.

3 Claims, 4 Drawing Figures

INVENTOR.
LUDWIK GUTNAJER
BY Edward M. Farrell

INVENTOR.
LUDWIK GUTNAJER
BY
Edward M Farrell
ATTORNEY

EDM ELECTRODE

Electric discharge machining, known as EDM, is a machining process in which electric discharges take place between an electrode and a conductive workpiece. The discharges vaporize minute particles of the workpiece and erode it so that it conforms substantially to the shape of the electrode.

During the electric discharging operation, dielectric fluid is circulated between and around the working face of the electrode and the workpiece to prevent overheating of either the electrode or the workpiece and also to carry away the metal particles machined from the workpiece.

Some EDM electrodes used heretofore have comprised shells with solid back-up material for support. Other EDM electrodes used heretofore comprised shells which permitted dielectric fluid to cool the electrodes on both sides. Many such hollow electrodes, however, have required back-up frames including spaced supporting ribs to give rigidity to the electrodes. These frames were generally attached to the electrodes by means of epoxy material. These epoxy materials acted as heat barriers during the electric machining operations. The heat barriers generally resulted in deformations and wear of the electrodes during machining operations. To overcome the generation of excessive heat, the rates of machining have to be limited.

In many cases, EDM electrodes are relatively large requiring a large amount of metal. It is desirable to reclaim this metal after it has served its purpose. If epoxy or other foreign materials are present in the metal to be reclaimed, additional steps are required to remove the epoxy before the metal can be reused. These additional operations add to the overall expense when new electrodes are formed.

While it is desirable to use a metal shell as the electrode in many cases, one problem has been to make the electrode relatively thin and still permit the electrode to be attached to a main ram or structure of the EDM machine. It is desirable that this be done without using dissimilar metals or epoxy materials which cause deformation of the electrode during operation or which present reclaiming problems.

It is an object of this invention to provide an improved EDM electrode and method for making the same.

It is a further object of this invention to provide an improved EDM electrode in which deformation of the electrode resulting from heat barriers during machining operations is minimized.

It is still a further object of this invention to provide an improved EDM electrode in which the metal used therein may be economically reclaimed for further use.

In accordance with the present invention, an EDM electrode and attachment means in a unitary piece are composed of the same metal material. The method of making the electrode includes the steps of providing a mandrel having a surface of the proper contour and depositing a first layer of metal on the mandrel. Metal inserts of the same metallic material as the first layer of metal are attached thereto. A second layer of metal of the same metallic material as the first layer and inserts is deposited over the first layer and metal inserts. The metal inserts are used to provide means for attachment to a main ram or structure of an EDM machine.

Other objects and advantages of the present invention will be apparent and suggest themselves to those skilled in the art from a reading of the following specification and claims, in conjunction with the accompanying drawing, in which:

Figure 1:
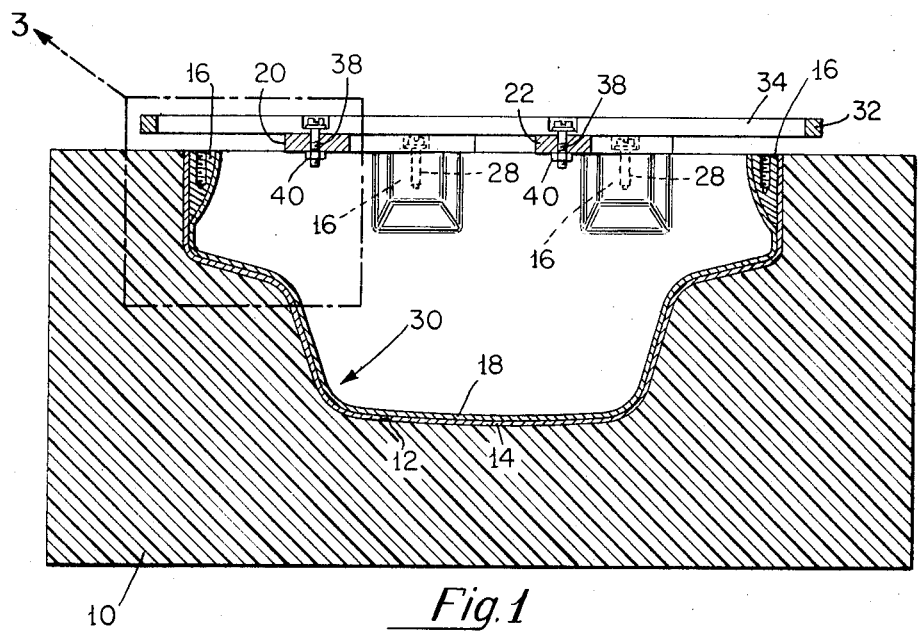
FIG. 1 is a cross-sectional view of an EDM electrode in a mandrel taken along lines 1—1 of FIG. 2, in accordance with the present invention.
Figure 2:
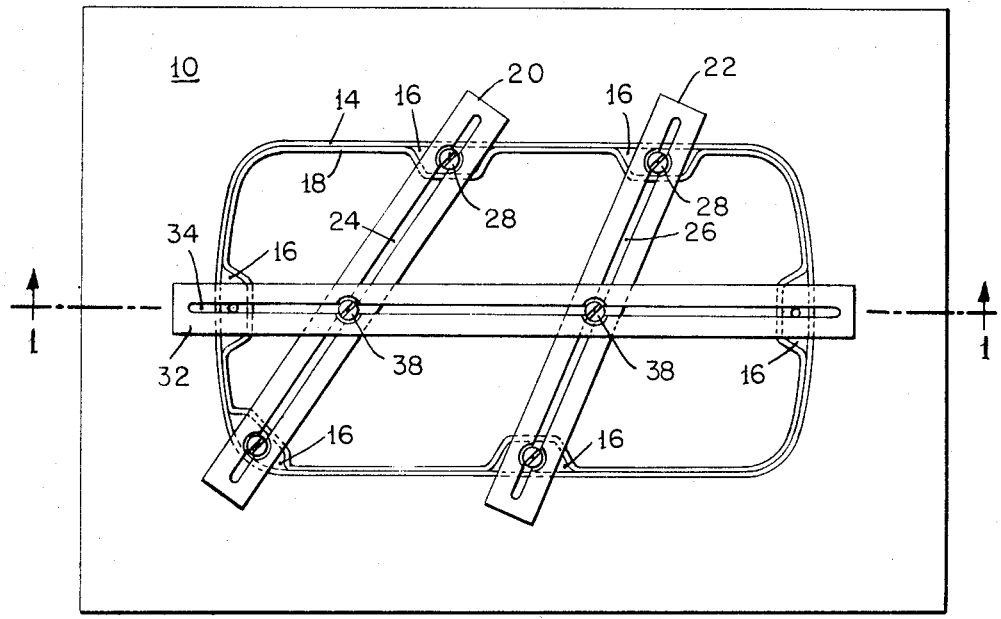
FIG. 2 is a top view of the EDM electrode and mandrel illustrated in FIG. 1.
Figure 3:
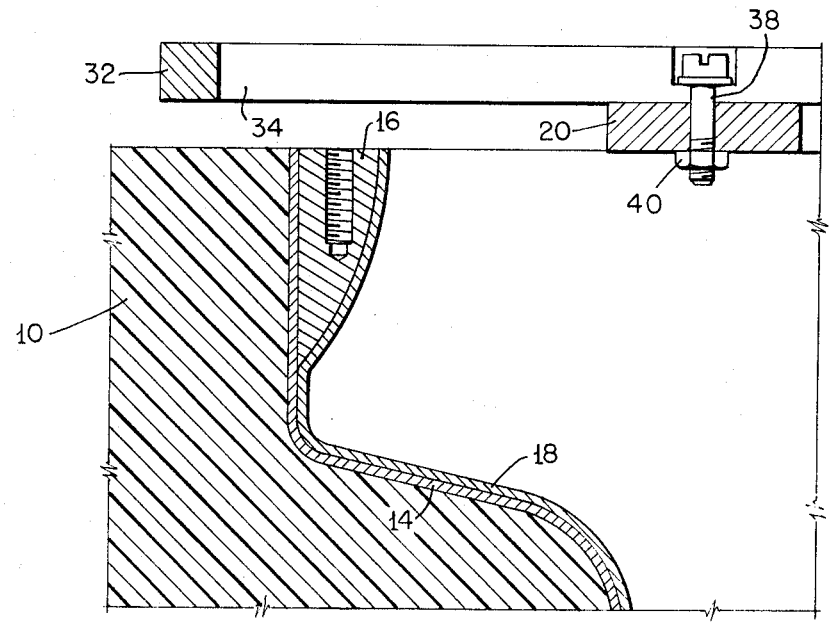
FIG. 3 is an enlarged view of the portion 3 illustrated in FIG. 1.

The present invention involves an electrode which may be formed by the electrodeposition of metal onto a mandrel. The techniques regarding electrodeposition are well known. Generally, the article to be plated, which may be a mandrel made of resin material is immersed in an electrolytic solution and becomes the cathode in the electrolytic system. Also immersed in the solution is an anode composed of the plating material. A voltage is applied between the cathode and the anode causing a current to pass through the electrolytic solution, which plates the cathode with the anode material to a desired thickness. The plating material may comprise one of a number of different metal materials, such as silver, nickel, copper and a variety of other metals. Because of its relatively non-wear properties, copper is the preferred embodiment for the electrode involving the present invention.

Because electrodeposition of metals is well known to those skilled in the art, detailed showings or explanation of such operations will be omitted in describing the present invention.

Referring to the drawings, a mold or mandrel 10 having a surface 12 dimensionally contoured to a desired configuration is provided. Prior to an electrodeposition operation, a thin coating of silver or other conductive metal (not illustrated) is coated to the mandrel surface to provide a cathode.

After the epoxy mandrel is formed, it is immersed in an electrolytic solution. A first layer of copper 14 is electrodeposited on the surface 12. The first layer of copper may be approximately 0.050 inches thick, being variable between 0.030 to 0.100 inches, for example. The thickness involved is not critical. After application of the first layer of copper, the mandrel 10 is removed from the electrolytic bath, rinsed and dried. The electrolytic bath is not illustrated.

A plurality of annealed copper inserts 16 are then attached to the first layer of copper 14 in spaced relationship with respect to each other. Insignificant amounts of electrically conductive epoxy or solder may be used to hold the inserts 16 in position. The copper inserts 16 are generally disposed toward the top edge of the electrode so that they will be out of the working area of the electrode and not affect the operation of the EDM electrode during subsequent machining operations. The metal inserts 16 are internally threaded so as to provide means to permit the electrode formed to be attached to the ram unit of the EDM machine. The inserts 16 are appropriately tapered in the manner illustrated to avoid sharp corners at the attachment points with the layer 14. This facilitates electrodeposition of a second layer of metal.

After attachment of the copper inserts 16 the mandrel 10 is returned to the plating tank including the electrolytic solution and a second layer of copper 18 is electrodeposited over the first layer of copper 14 and around exposed portions of the metal inserts 16. The deposit is continued until an additional thickness of approximately 0.220 inches is achieved. The thickness is not critical and is dependent upon strength requirements and the uniformity of electrodeposition achievable under certain conditions, such as rate of electrodeposition, applied voltages etc. The thickness may extend to 0.250 inches or higher. The mandrel 10, with its copper layers 14 and 18 and embedded inserts 16, is then removed from the electrolytic bath. The electrode formed may be considered as an open ended hollow shell having a top edge portion including spaced metal inserts to provide attachment means.

After the mandrel 10 is removed from the electrolytic bath, a pair of steel plates 20 and 22, including elongated slot openings 24 and 26, respectively, are placed over selected ones of the metal inserts 16. Screws 28 extend through the slot opening to threadedly engage the copper inserts 16 to secure the plates 20 and 22 to the EDM electrode 30.

Another elongated steel plate 32, including a slot opening 34, is provided to connect the plates or strips 20 and 22 to a movable ram member 36 (FIG. 4), which comprises part of an EDM machine. The plate 32 is mounted to the plates 20 and 22 by means of bolts extending through the slot openings 24, 26 and 34. The bolts are held in place by means of nuts 40. In some cases, it may be desirable to mount the plate 32 directly to selected ones of the inserts 16, in addition to mounting it to plates 20 and 22. Spacer elements may be included between the plate 32 and the inserts when plates 20 and 22 are used in the manner illustrated. After attachment of the plates 20, 22 and 32, the resin comprising the mandrel 10 is removed by any suitable means, such as by dissolving in a chemical solution. The mandrel may be removed from the electrode prior or after attachment of the plates 20 and 22.

Figure 4:
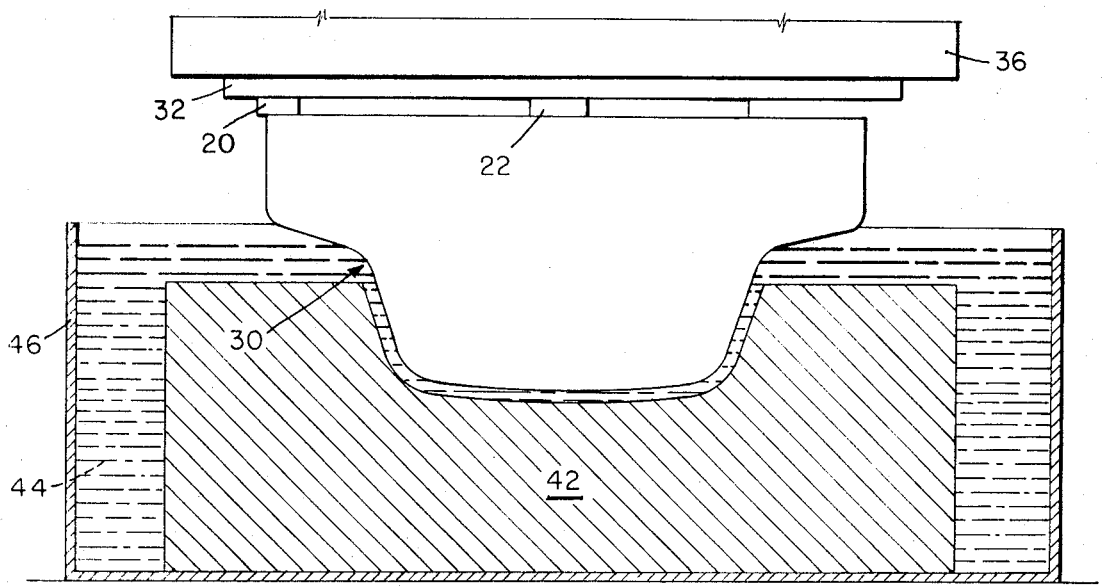
FIG. 4 illustrates the electrode of FIGS. 1, 2 and 3 during a machining operation.

FIG. 4 illustrates the EDM electrode 30 mounted to a ram 36 by any suitable means, such as nuts and bolts not illustrated. Prior to mounting, the plate 32 is machined so that the electrode 30 is precisely aligned with its top edge portion parallel to the bottom of a metal workpiece 42. The workpiece 42 is disposed in a tank 46 including dielectric fluid 44. As the EDM electrode 30 is moved downwardly by suitable motor means not illustrated, the workpiece 42 is machined to form a cavity conforming to the contour of the surface of the electrode 30.

The various details relating to the cooling of the electrode 30 are not illustrated. This may involve insertion of openings in the electrode to permit flow of the dielectric fluid at the back of the electrode.

While the electrode described includes six inserts, it is apparent that more or less randomly spaced inserts may be used. More than two or three mounting plates may also be used dependent upon the size of the electrode and the ram configuration to which the electrode is to be attached.

The slot openings in the mounting plates 24, 26 and 32 eliminate the need for precisely locating the copper inserts with respect to a particular EDM machine ram configuration.

The EDM electrode and the mounting means including the metal inserts may be considered a unitary piece. The metal bonding between the electrode and the metal inserts is extremely strong because similar metallic material is involved and because of the plating technique employed.

In some cases, it may be desirable to have the metal inserts include threaded portions extending outwardly from the inserts. These threaded portions would be protected during the plating operations and would permit the electrode to be attached to the plates by means of nuts. Other types of attachment means may be associated with the metal inserts illustrated.

The present invention has provided an EDM electrode with attachment means which is made with one metallic material, preferably copper. In addition to eliminating heat barriers caused by the presence of other materials, the all copper electrode makes it possible to reclaim the copper for further use without requiring additional operations to remove the foreign material.

What is claimed is:

1. An electrode assembly for an electric discharge machining operation comprising a relatively thin hollow open ended metallic shell, said shell including a top edge portion at the open end of said shell, said shell comprising two layers of similar metallic material, a plurality of spaced metallic threaded inserts providing attachment means disposed between said two layers of metallic material and plated thereto along said top edge portion of said shell, said inserts being made of the same type of material as said two layers of metallic material whereby said electrode and said attachment means provide an integral body of the same metallic material, and metal strips having slot openings therein, and means to connect said strips to said metallic threaded inserts.

2. An electrode assembly as set forth in claim 1 wherein said metallic material comprises copper.

3. A process for making an electrical discharge machining electrode assembly comprising the steps of:
   a. providing a mandrel including a surface of a desired contour;
   b. depositing a first metallic layer on said surface;
   c. attaching a plurality of spaced threaded metallic inserts of the same material as said first metallic layer to said first metal layer;
   d. depositing a second metallic layer of the same material as said first metallic layer and said inserts on said first metallic layer and said plurality of metallic inserts to secure said metallic inserts between said first and second metallic layers;
   e. mounting metal strips to said metallic inserts.

* * * * *